Aug. 2, 1927.  W. E. TRUMPLER  1,637,361
DAMPING DEVICE
Filed Aug. 25, 1923
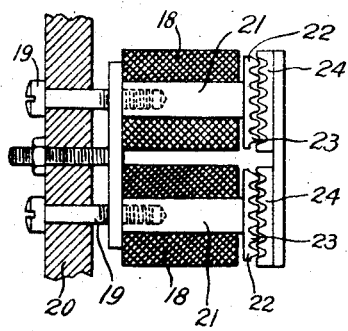
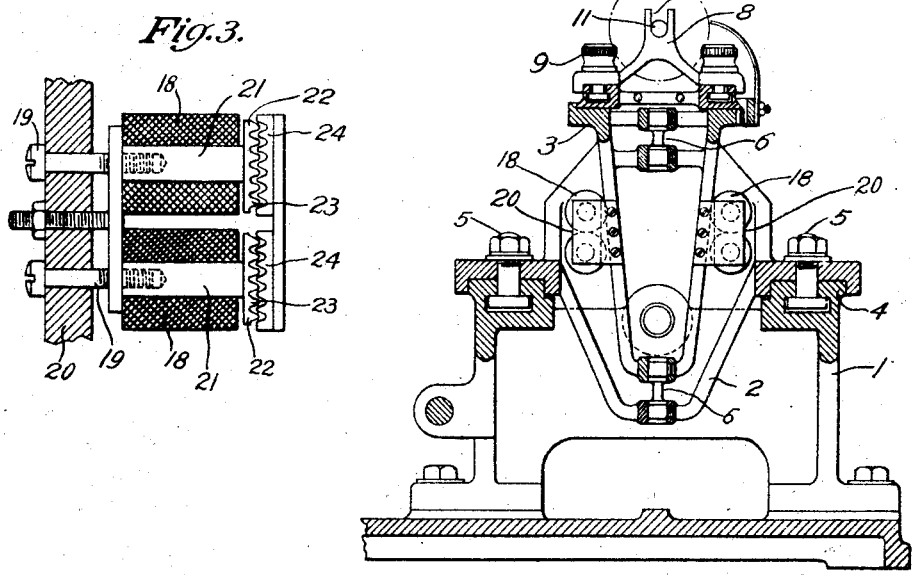
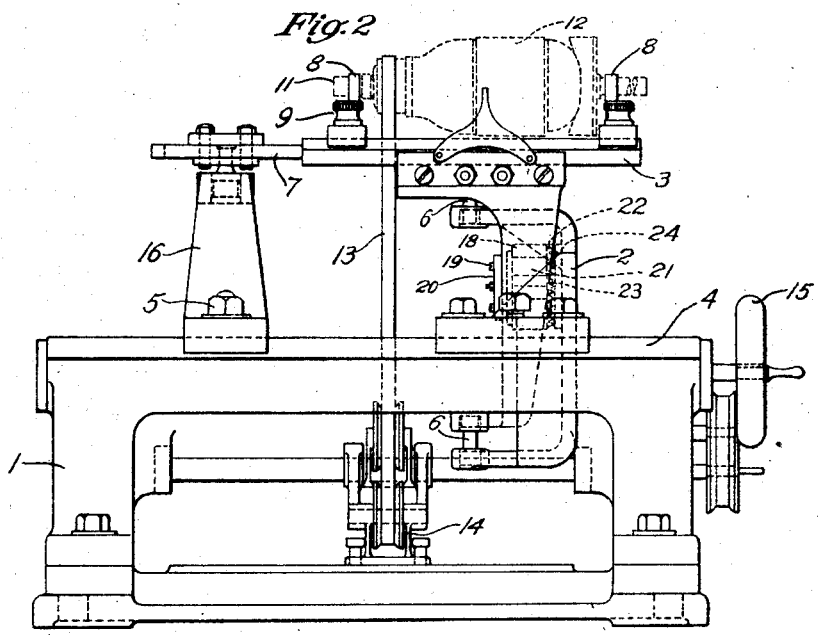
WITNESSES:
INVENTOR
William E. Trumpler
BY
Wesley G. Carr
ATTORNEY Patented Aug. 2, 1927.

1,637,361

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

DAMPING DEVICE.

Application filed August 25, 1925. Serial No. 52,370.

My invention relates to balancing machines, and more particularly to apparatus for dynamically balancing rotors, such as armatures for dynamo-electric machines.

It is among the objects of my invention to provide a balancing machine embodying a damping device of simple, compact and durable construction for damping the vibrations of the oscillatable bed member.

Another object of my invention is to provide electromagnets for damping the vibration of balancing machines which shall be designed to dampen the vibration of the movable bed member without influencing its frequency of vibration to any material extent.

In my copending application, Serial No. 736,458, filed Sept. 8, 1924, I have described a balancing machine comprising a stationary base, a movable fulcrum support, an oscillatable bed member carried by said support, and means for journalling a rotor to be tested on the bed member. This type of balancing machine distinguishes from prior types in that the movable or yielding elements are arranged vertically relative to the fulcrum axis as distinguished from the horizontal arrangement heretofore employed.

In that application, I have further disclosed electromagnetic damping means associated with the movable bed and fulcrum support for damping the vibrations thereof.

My present invention relates to an improved type of electromagnet, for the vertical type of balancing machines, which is designed and constructed to effectively dampen the vibrations of the balancing machine bed without influencing the frequency of vibration, and I have found that the electromagnet described in my prior application was deficient in that it had an undesirable influence on the frequency of the vibrating system, thereby requiring adjustment of the speed of rotation of the member being tested for any change in the excitation of the magnets. This deficiency was due to the increase of magnetic force with a decrease of air gap, which introduced a negative spring factor that reduced the natural frequency of vibration.

I overcome these difficulties by utilizing dampening magnets having corrugated pole surfaces in which the corrugations run either straight (parallel to each other) or concentric. The profile may be straight, curved or circular, but is preferably of a gear-tooth shape. This form of pole surface provides a constant pull for variable air gaps, and variable excitation of the magnets does not cause a departure from this characteristic, thus, not materially influencing the frequency of vibration of the vibrating system. The electro-magnets themselves are secured to the balancing machine in the same manner as illustrated and described in the above-mentioned application, and their general function and characteristics are likewise the same as therein described, with the exception of the improvements which will be hereinafter set forth.

In accompanying drawing constituting a part hereof and in which like reference characters designate like parts, Figure 1 is a view, partially in section and partially in end elevation of a balancing machine embodying the principles of my invention.

Fig. 2 is a view in side elevation thereof, and

Fig. 3 is an enlarged detail view of the improved type of electromagnet that is utilized in the machine shown in Fig. 1.

Referring to Figs. 1 and 2, the device therein illustrated comprises a lower stationary base or bed member 1 carrying a movable fulcrum support 2 that engages an oscillatable bed member 3.

The fulcrum support 2 is mounted on the ways 4 of the base 1 and may be secured in any fixed position by a plurality of T-bolts 5. The oscillatable bed member 3 is held in position by a plurality of upper and lower vertical fulcrum members 6 of a resilient type, and one end of the bed is yieldingly restrained against movement, by a spring member 7. The bed member 3 is provided with yokes 8, which are secured thereon by thumb screws 9 to permit adjustment of their horizontal center distance; and these yokes are provided with vertical slotted openings 10 for receiving a shaft 11 of a body or rotor 12 for the purpose of testing the same for dynamic balance.

As shown in Fig. 2, the body to be tested consists of an armature 12 for dynamo-electric machines, which is connected by a belt 13 to a driving pulley 14 that is actuated by a suitable prime mover, such as a motor or counter-shaft.

The fulcrum member 2 is movable horizontally along the ways 4 of the bed member 1 by a hand wheel 15, and the spring element 7 on the bed 3 may be stiffened or flexed by horizontally adjusting its pedestal member or spring support 16 to vary the leverage on the spring element.

A plurality of electromagnets 18 are fastened by screwbolts 19 to a pair of plates 20 that are fixed to the bed member 3. These magnets are provided with cores 21 having extended pole ends 22, the faces of which are provided with teeth or corrugations 23. Similar pole members 24 are secured to the fulcrum support 2 in cooperative alinement with the pole ends 22 and they are so arranged that the projections of the corrugations of one pole face will aline with the spaces in the other, as shown in Fig. 3.

In the operation of the balancing machine, the rotation of the armature 12, which is effected by its connection through the belt 13, will induce a vibration in the oscillatable bed member 3 corresponding to the degree of dynamic unbalance or the amount of unbalanced mass in the rotor. The oscillatory movement of the bed member about the vertical resilient fulcrums 6 thus indicates an unbalanced condition of the rotor and the approximate amount of the correction necessary to balance the same, which has been more fully set forth in the afore-mentioned application.

It is very necessary, however, to introduce a dampening medium for restraining the vibration of the bed member and for this purpose the magnet coils 18 are energized to set up a magnetic force between the faces of their poles. I have found that, by utilizing the type of corrugated faces shown in Fig. 3, effective damping may be introduced without influencing the frequency of vibration of the system or without such vibration being affected in degree by the speed of rotation of the rotor.

Although I have shown a particular application of electromagnets having irregularly shaped pole faces, it is obvious that such magnets may be utilized for other purposes where it is desired to obtain variable air gaps for changing excitation, and furthermore, the irregularities of the pole faces may be of any suitable shape or design without departing from the principles herein set forth. Although I have illustrated the magnets as applied to the vertical type of balancing machine, they may obviously be applied to a machine of the horizontal type.

I claim as my invention:

1. A balancing machine comprising a stationary base and a vibratory bed, and electromagnetic damping means for said bed, said means comprising electromagnets having toothed pole pieces secured to said base and bed and adapted to dampen the vibratory movement of said bed without materially influencing the frequency of vibration thereof.

2. A balancing machine comprising a stationary base and a vibratory bed, and electromagnetic damping means for said bed, said means comprising electromagnets having tooth shaped pole faces secured to said base and bed in cooperative working alinement.

3. A balancing machine comprising a stationary base and a vibratory bed, and electromagnetic damping means for said bed, said means comprising electromagnets having corrugated pole faces disposed towards each other in cooperative working alinement.

4. A balancing machine comprising a stationary base and a vibratory bed, and electromagnetic damping means for said bed, said means comprising electromagnets having corrugated pole faces disposed towards each other in spaced relation and in cooperative working alinement to provide an air-gap therebetween.

5. A balancing machine comprising a stationary base and a vibratory bed, and electromagnetic damping means for said bed, said means comprising electromagnets having irregularly shaped pole faces secured to said base and bed in cooperative working alinement, said irregularly shaped pole faces being adapted to provide a variable air gap to correspond to variations of applied magnetic force.

6. A balancing machine comprising a stationary base and a vibratory bed, and electromagnetic damping means for said bed, said means comprising electromagnets having corrugated pole faces disposed towards each other in spaced relation, with the projections of the corrugated surface of one face in alinement with the spaces of the cooperating member.

7. A balancing machine comprising a base, a fulcrum support movably mounted thereon, a spring support secured to said base, a plurality of flexible members secured to said supports, an oscillatable bed carried by said fulcrum support, means for moving the latter relative to said bed, means for yieldingly restraining movement of said bed, and means for journalling a rotor to be tested on said bed, said restraining means comprising a plurality of electromagnets associated with said fulcrum support and bed and having corrugated pole faces.

8. A balancing machine comprising a base, a fulcrum support movably mounted thereon, a spring support secured to said base, a plurality of flexible members secured to said supports, and oscillatable bed carried by said fulcrum support, means for moving the latter relative to said bed, electromagnets secured to said fulcrum support and bed having irregularly shaped pole faces in cooperative alinement.

In testimony whereof, I have hereunto subscribed my name this 6th day of August 1925.

WILLIAM E. TRUMPLER.